Inventors
T. KAWAHASHI
H. SHIKI
By R P Morris
Attorney

Inventors
T. KAWAHASHI
H. SHIKI
By R. P. Morris
Attorney

Inventors
T. KAWAHASHI
H. SHIKI
By R. P. Morris
Attorney

Inventors
T. KAWAHASHI
H. SHIKI
By R. P. Morris
Attorney

Inventors
T. KAWAHASHI
H. SHIKI
By [signature]
Attorney 3,372,350

ARRANGEMENT FOR COMPENSATING AMPLITUDE AND PHASE DISTORTION OF AN ELECTRIC SIGNAL

Takeshi Kawahashi and Haruo Shiki, Tokyo, Japan, assignors to Nippon Electric Company, Limited, Tokyo, Japan, a corporation of Japan Filed Sept. 17, 1963, Ser. No. 309,512

Claims priority, application Japan, Sept. 17, 1962, 37/40,297

19 Claims. (Cl. 333—28)

Figure 1:
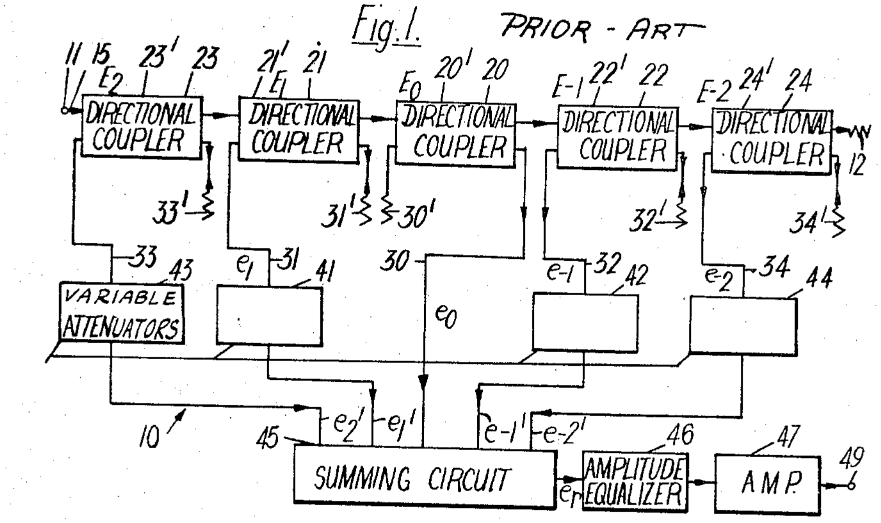

This invention relates to an arrangement for compensating distortion present in the frequency characteristics of amplitude, or loss, and phase, or delay, of an electric signal transmitted in the VHF band or a frequency band adjacent thereto and, more particularly, to a novel arrangement for compensating for such distortion of an electric signal of the intermediate frequency band, namely VHF or UHF band, in a radio repeater or a radio terminal equipment of a microwave (UHF to VHF) wideband relay system.

In both VHF and microwave relay systems, distortion is introduced at a radio repeater and/or radio terminal equipment, which distortion appears in the frequency characteristics of the amplitude and phase of an electric signal passing therethrough. An arrangement based upon the principles of a transversal equalizer is the most preferable among the proposed arrangements to compensate for such distortion. However, the conventional arrangements still have small ripple-like residual distortion in the frequency characteristics of the compensated amplitude and phase of the electric signal, particularly of a frequency-modulated wave. Such residual distortion has a considerable adverse affect upon differential gain and differential phase, and hence upon the quality of the relay system. Such an arrangement can therefore not perform either infallible or sufficient compensation in such a relay system as the present-day microwave system, which require transmission characteristics of a very high quality in order to be able to increase the number of channels employed within a given frequency band and further to realize colour television links and which also require excellent selectivity with a view to decreasing interference between adjacent radio channels.

Also, the directional couplers employed in the above proposed arrangements are difficult to manufacture, have coupling coefficients which exhibit inferior frequency characteristics, and further require a separate amplitude compensator for improving the inferior frequency characteristics. Further, the terminating resistors contained in the proposed arrangement, are subject to a lack of uniformity in manufacture and have poor stability. In addition, the forms of distortion which can be compensated for by the proposed arrangement are only those which may be approximated by addition of sine-form ripple-like distortions of different and preferably small pitches under some limited conditions. Small-pitch ripple-like distortion which is introduced in the most part by echoes in the feeder in the aerial system, however, cannot be suitably compensated for by such arrangements because they undergo change, with such change caused by adjustment of matching of the input and output portions of the transmitter and receiver. Development of isolators has much reduced such small-pitch ripple-like distortion. Consequently, larger-pitch ripple-like distortion must generally be considered as the main concern for compensation by such a compensating arrangement.

This invention provides an arrangement for compensating for distortion caused in the frequency characteristics of the amplitude and phase of an electric signal under transmission, and which may seem to be similar to a conventional arrangement based upon the transversal equalizer principles. However, the reflection method of the conventional arrangement, which employs variable terminal resistors is not utilized in the instant invention. In this invention, compensation is performed by combining, in a summing or combining circuit, a main signal tapped off from an electric signal under transmission through a delay line, such as a coaxial cable, by way of a specific directional coupler to be later described, and leading and lagging signals which are tapped off from the electric signal by way of substantially similar directional couplers disposed prior to and posterior to the first-mentioned directional coupler with reference to the sense of transmission of the input electric signal, respectively, and whose amplitudes are adjusted by respective variable attenuators and whose phases are preferably adjusted within a narrow range by respective variable line stretchers.

A general object of the invention is to provide a phase compensating arrangement and an amplitude compensating arrangement which is easily adjustable and has very small residual distortion.

Another object of the invention is to provide an arrangement for compensating distortion in the frequency characteristics of the amplitude and phase of an electric signal, wherein distances between a plurality of directional couplers are adjustable considerably freely and independently.

Still another object of the invention is to provide an arrangement of the type described, wherein no separate amplitude compensator is necessary to compensate the frequency characteristics of the coupling coefficient of the directional couplers.

A further object of the invention is to provide an arrangement of the type described which is easily manufactured and very stable since it does not require the use of variable terminal resistors which are difficult to manufacture and because the directional couplers used are only of a type which are easy to manufacture.

Figure 2A:
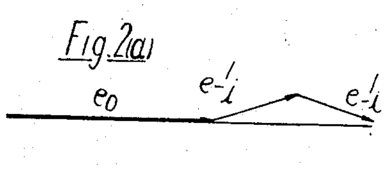
Figure 2B:
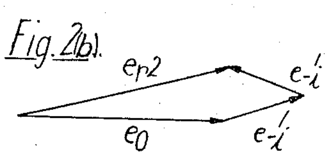
Figures 3A, 3B:
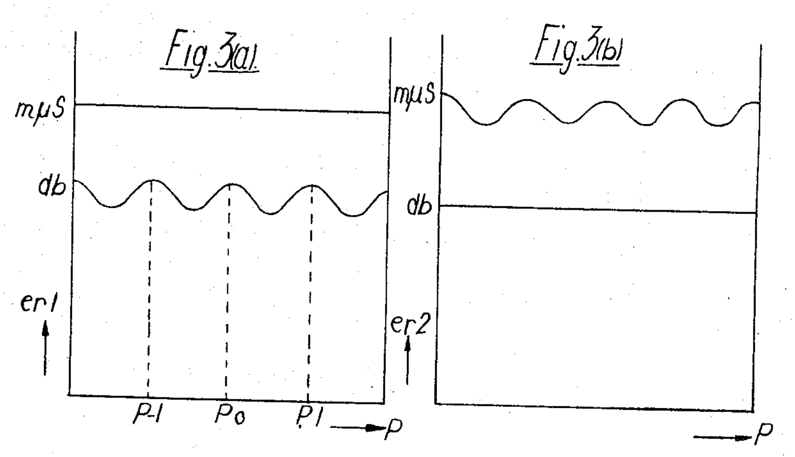
Figures 4, 5, 5A, 5B, 6, 7A, 7B:
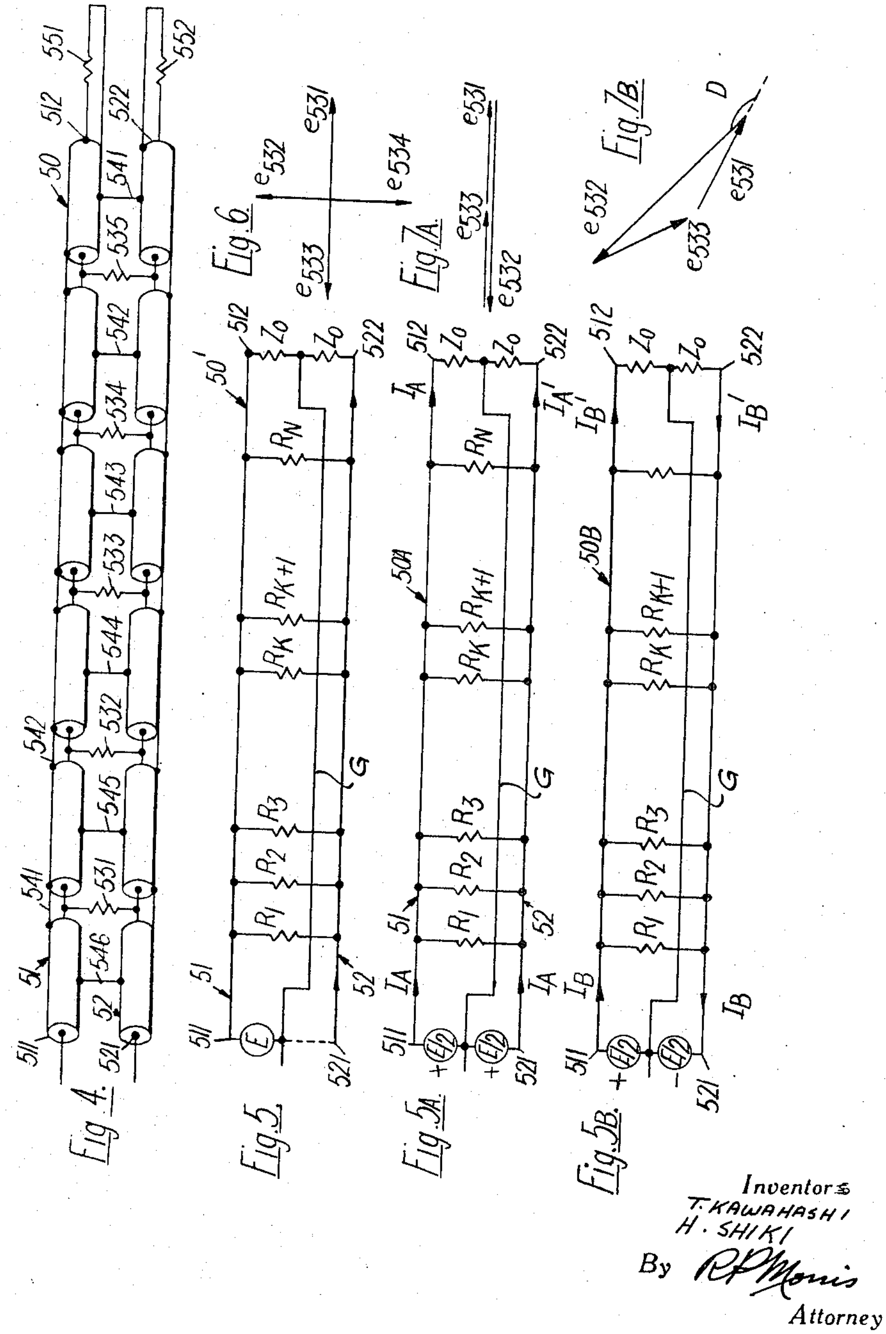
Figure 8:
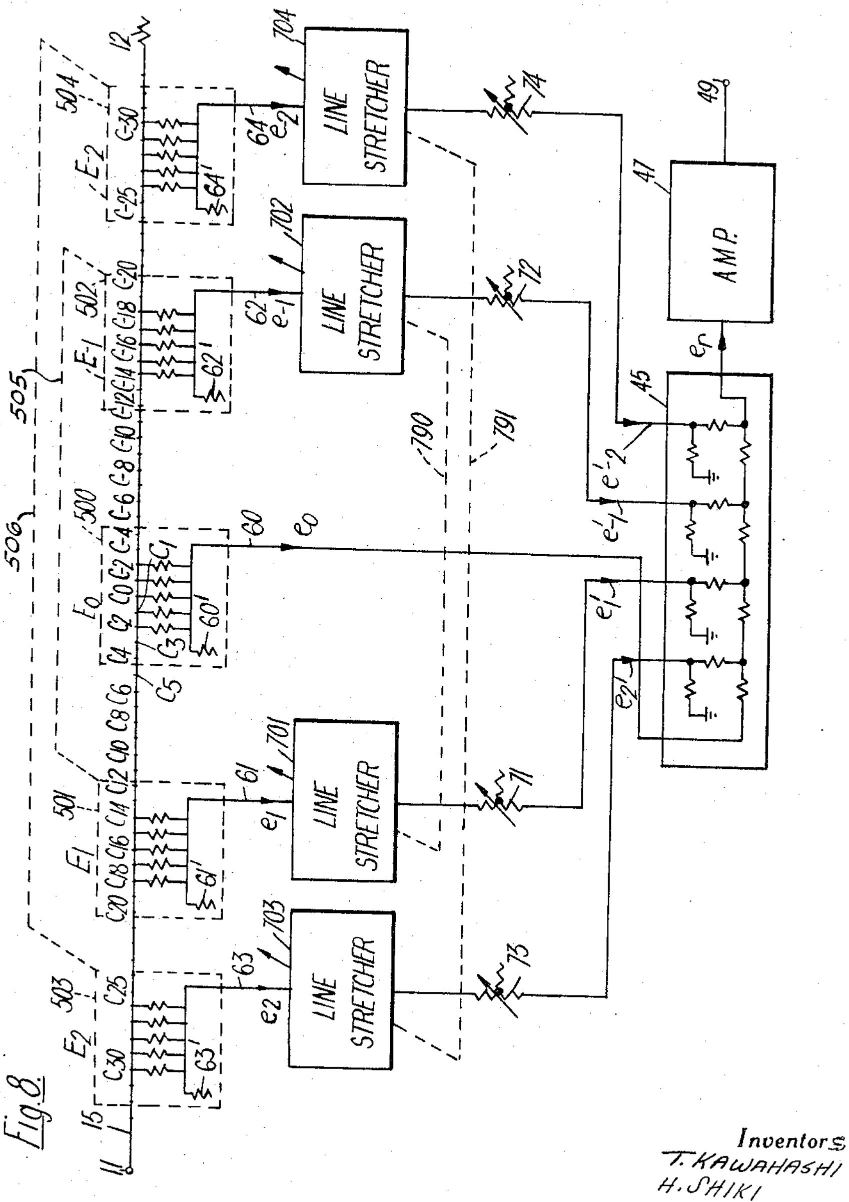
Figure 9:
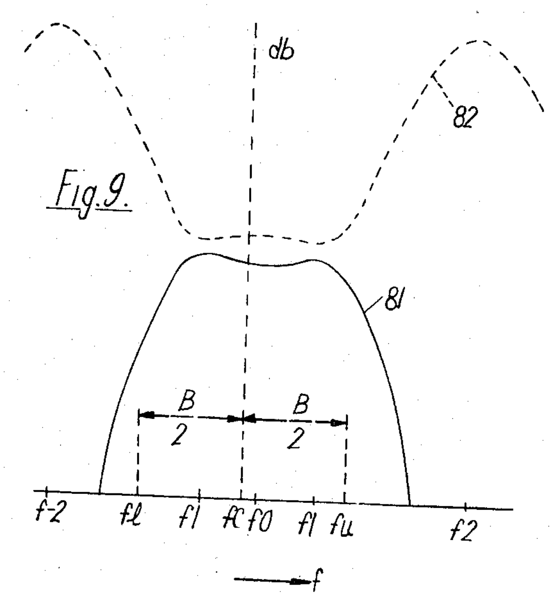
Figure 10:
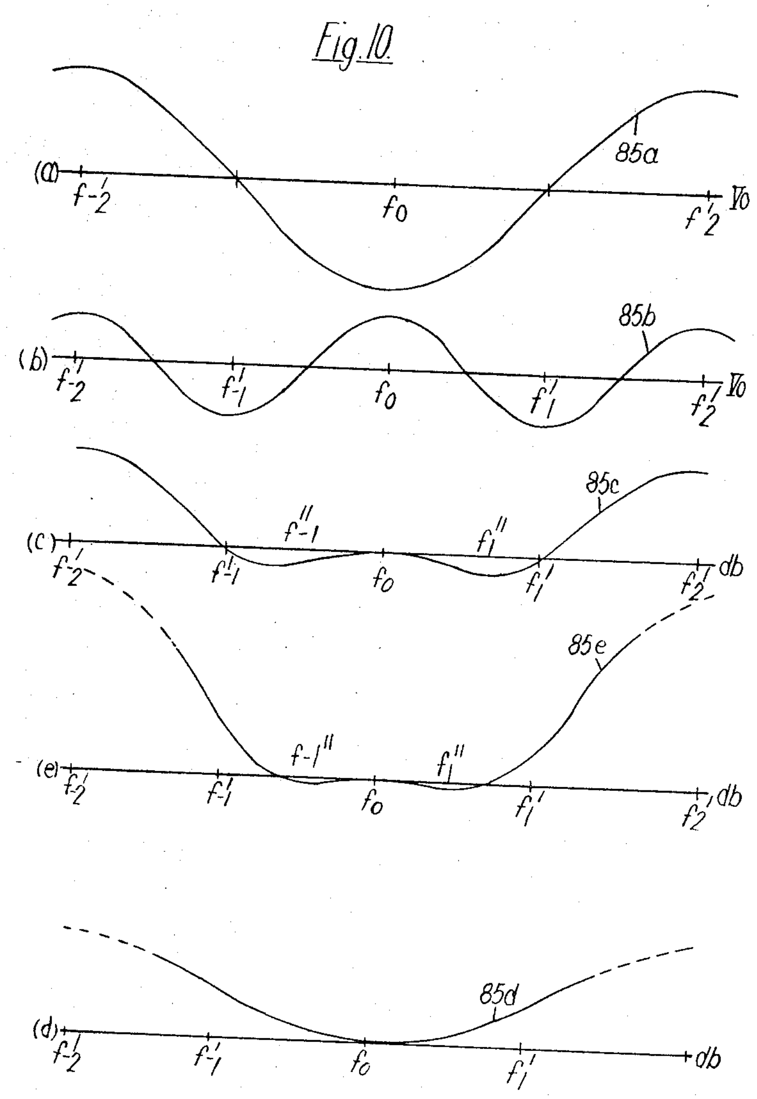

The above-mentioned and other features and objects of this invention and the manner of attaining them will become more apparent and the invention itself will be best understood, by reference to the following description of an embodiment of the invention taken in conjunction with the accompanying drawings, wherein:

FIG. 1 is a circuit diagram of a conventional compensating arrangement,

FIG. 2 shows vector diagrams for illustrating resultant signals obtained by the arrangement of FIGURE 1, FIGURES 3*a* and 3*b* shows frequency characteristics of the amplitude and phase of the arrangement of FIGURE 1, FIG. 4 is a schematic perspective view of a directional coupler used in a compensating arrangement of the invention, FIGS. 5, 5A, and 5B are circuit diagrams for explaining the characteristics of the directional coupler shown in FIG. 4, FIG. 6 is a voltage vector diagram for explaining the manner of choosing the resistance of bridging resistors in an example of the directional coupler shown in FIG. 4, FIGS. 7A and 7B are voltage vector diagrams for explaining the frequency characteristics of directivity of another example of the directional coupler shown in FIG. 4, FIG. 8 is a block diagram of an embodiment of the invention, and FIGS 9 and 10 show frequency characteristics of the amplitude for explaining an application of the embodiment of the invention.

Referring to FIG. 1, a conventional compensating arrangement 10 based upon the transversal equalizer principles will now be explained somewhat in detail for a better understanding of the invention itself. The arrangement 10 is similar to that described in published articles such as "Experimental Transversal Equalizer for TD-2 Radio Relay System" in "Bell System Technical Journal," vol. 36 (1957), pp. 1429–1450 (November).

In this arrangement, a directional coupler 20 is attached at a point 20' selected along a delay line 15. This line consists of a coaxial cable having a characteristic impedance $Z_0$ and having an input terminal 11 and a non-reflective termination 12. A pair of directional couplers 21 and 22 are attached to points 21' and 22' spaced from the selected point 20' along the delay line 15 by a distance $l(1,0)=A$ and a distance $l\ (0,-1)=-A$ towards the input terminal 11 and the termination 12, respectively. Another pair of directional couplers 23 and 24 are attached to points 23' and 24' spaced from the selected point 20' by distances $l(2,0)=2A$ and $l\ (0,-2)=-2A$, respectively where A is any arbitrary distance. A detailed description of the directional couplers 20–24 is set forth in the cited "Bell System Technical Journal."

If the signal $E_0$ at a time $t$ at the selected point 20' is $$E_0=E.\exp(jpt)$$

(where E is a constant representing the amplitude of the signal being transmitted through the delay line 15, $p$ is the angular frequency of the signal, and $j$ is the imaginary unit), and if $$l(i,\ 0)=l(0,\ -i),\ |iA|=|-iA|i=1,\ 2,\ 3,\ .\ .\ .$$

and if the delay of the signal while it propagates through the distance $l(i,\ 0)$ or $l(0,\ \ -i)$ is $t_i$ ($t$=1, 2, 3, . . .), then the signals $E_i$ at the time $t$, at the points 21', 23', . . . and the signals $E_{-i}$ at the points 22', 24', . . . which lead and lag the signal $E_0$ at the selected point 20' are given by $$E_i=E.\exp(jp[t+t_i])$$

and $$E_{-i}=E.\exp(jp[t-t_i])$$

respectively.

A portion of the signal $E_0$ tapped off at the selected point 20', by the directional coupler 20, propagates through a line 30 having the cable characteristic impedance $Z_0$ and a non-reflective termination 30'. The tapped-off signal will hereinafter be identified by the term main signal and denoted by the symbol $e_0$. Respective portions of the signals $E_i$ and $E_{-i}$ tapped off at the points 21' and 22' and points 23' and 24' by pairs of the directional couplers 21 and 22 as well as 23 and 24 propagate through lines 31 and 32 as well as lines 33 and 34 having the cable characteristic impedance $Z_0$ towards variable terminal resistors 31' and 32' as well as 33' and 34' which terminate the lines 31 and 32 as well as 33 and 34 and which have variable impedances $Z_i$ and $Z_{-i}$, ($i$—1, 2, 3, . . .), respectively. The tapped-off signals are reflected as inphase or opposite-phase signals (i.e. out-of-phase), dependent upon whether the variable impedances $Z_i$ and $Z_{-i}$ are greater or smaller than the cable characteristic impedance $Z_0$, and again pass through the directional couplers 21 and 22 as well as 23 and 24 to become, for the most part, paired reflected signals $e_i$ and $e_{-i}$ propagating through the lines 31 and 32, as well as 33 and 34. The reflected signals $e_i$ and $e_{-i}$ pass through variable attenuators 41 and 42, as well as 43 and 44, while they propagate through the lines 31 and 32, as well as 33 and 34.

Signals $e'$ and $e_{-i}'$ which appear after the paired reflected signals $e_i$ and $e_{-i}$ have passed through the variable attenuators 41 and 42 as well as 43 and 44 are, if the attenuations given by the variable attenuators are $g_i$ and $g_{-i}$ and if $$g_i=g_{-i}$$

given by $$e_i'=g_i.|e_i|.\exp(jp[t+t_i]+P)$$

and $$e_i'=g_i.|e_{-i}|.\exp(jp[t-t_i]+P)$$

where P is equal to 0 when $Z_i$ and $Z_{-i}$ are greater than $Z_0$ and $\pi$ when $Z_i$ and $Z_{-i}$ are smaller than $Z_0$. The lines 30, 31, 32, 33 and 34, which are all of the same length, cause the amplitude-adjusted reflected signals $e_i'$ and $e_{-i}'$ to be added to the main signal $E_0$ in summing circuit 45 to produce a resultant signal $e_r$. If $$Z_i=Z_{-i} \tag{1}$$

the resultant signal $e_{r1}$ is given by the vector sum shown in FIG. 2*a* as described in the cited "Bell System Technical Journal." In general, lagging of the phase caused by a delay line to the high-frequency power whose frequency is higher than the order of a megacycle, increases with an increase in the frequency of the high-frequency power. In the arrangement 10, the vector representing the adjusted reflected signals $e_i'$ and $e_{-i}'$ will therefore turn in FIG. 2*a* clockwise and counterclockwise relative to the vector representing the main signal $e_0$, respectively, with increase of the frequency of the input signal, with the result that the magnitude $|e_{r1}|$ of the resultant signal $e_{r1}$ for such higher-frequency components varies while the phase thereof remains substantially unchanged.

If $$Z_i-Z_0)/(Z_i+Z_0)=Z_{-i}-Z_0)/(Z_{-i}+Z_0)$$

or if $$Z_i.Z_{-i}=Z_0^2 \tag{2}$$

the resultant signal $e_{r2}$ is given by the vector sum shown in FIG. 2*b*. The phase of the resultant signal $e_{r2}$ changes with an increase in frequency of the input signal, while the magnitude $|e_{r2}|$ remains substantially unaltered. The resultant signal $e_r$ obtained by adding in the summing circuit 45 the main signal $e_0$ and some pairs of the reflected signals $e_i$ and $e_{-i}$ after their amplitudes have been adjusted by the variable attenuators 41 and 42 as well as 43 and 44 will become, if the impedances $Z_i$ and $Z_{-i}$ of the variable terminal resistors 31'–34' satisfy the Equation 1, $$e_{r1}=\exp(jpt)\cdot(1+\sum_i K_i\cdot\cos pt_i) \tag{3}$$

and if they satisfy the Equation 2, $$e_{r2}=\exp(jpt)\cdot(1+j\cdot\sum_1 K_i\cdot\sin pt_i) \tag{4}$$

where the coefficient $K_i$ is given by the relation $$2g_i.e_i|/|e_0|=2g_i.|e_{-i}|/e_0|$$

If now the resultant signal $e_r$ is plotted against the angular frequency $p$ in a case where $i$ is equal to 1 and both $|e_1|$and$|e_{-1}|$ are equal to a given value, then the resultant signal $e_{r1}$ given by the Equation 3 will become as shown in FIG. 3*a*, i.e., a signal whose amplitude (indecibels) will vary and whose phase or delay (in microseconds) will not vary, while the resultant signal $e_{r2}$ given by the Equation 4 will be as shown in FIG. 3*b*, a signal whose delay will vary and whose amplitude will not vary. The resultant signal $e_r$ which in this manner gives desired amplitude or phase compensation, is further amplitude-compensated by an amplitude equalizer 46. This amplitude compensation is necessary because the frequency characteristics of the directional couplers 20–24 are not ideal. The resultant signal thus obtained is amplified by an auxiliary amplifier 47 and then sent out through an output terminal 49.

The directional couplers 20–24 usually used in the compensating arrangement 10 based upon the transversal equalizer principles are those formed by electromagnetically coupling the central conductors of a pair of coaxial cables. The electrical length of the electromagnetic coupling must be about ¼ of the wave length of the signal to be handled, in order to obtain good frequency characteristics of coupling, and must be as long as about one meter when the center frequency of the band handled is 70 mc. A directional coupler of such great length is laborious to manufacture and also makes it extremely difficult to improve the input and the output impedances. Therefore, short electrical lengths are much preferred for obtaining the electromagnetic coupling of the directional couplers 20–24 and such distortions in the frequency characteristics of the transmitted amplitude as may be caused by six-decibel deviation of the coupling per octave in the band being handled is smoothed by the addition of an amplitude equalizer 46 of linear slope.

If it is intended to compenate for amplitude distortion with the compensating arrangement 10 by making $$\cos p_0T=1$$

at a certain angular frequency $p_0$ illustrated in FIG. 3*a*, one of the delay times T satisfying $$p_0T=2\pi N, \quad (N=1, 2, 3, \ldots) \quad (5)$$

must be selected. As a result, the angular frequencies $p_1$ and $p_{-1}$ satisfying $$(p_1-p_0)T=2\pi$$

and $$(p_0-p_{-1})T=2\pi$$

must be selected as those at which the amplitude characteristics are maximum on the righthand and the lefthand sides of the angular frequency $p_0$. In other words, the ripple-like characteristics cannot be optional. Thus, it is necessary with the proposed arrangement 10 to adjust the delay time $t_1$ by changing the distances between the directional couplers 20–24 in order to reduce as far as possible the residual cosine-form ripples appearing in the compensated amplitude characteristics in the neighbourhood of the central angular frequency $p_0$ of the input signal.

This also is the case with the delay characteristics. Moreover, it is in practice very troublesome with the proposed arrangement 10 to retain, when the distance $l(1, 0)$ between the directional coupler 20 for tapping off the main signal $e_0$ and the adjacent directional coupler 21 is lengthened, the distance $l(2, 0)$ between the reference directional coupler 20 and a further directional coupler 23 by shortening the distance between the directional couplers 21 and 23.

In addition, the variable terminal resistors 31'–34' of the proposed arrangement 10 for adjusting the amplitude and particularly the phase of the reflected signals $e_1$ and $e_{-1}$ are liable to deviate in value from one another during manufacture and further are not stable. Also, the directional couplers 20–24 in the proposed arrangement 10 must have excellent directivity characteristics.

Referring to FIG. 4, a directional coupler 50 to be used in a compensating arrangement of the invention comprises first and second coaxial cables 51 and 52 which are disposed in substantially parallel fashion and which have a cable characteristic impedance $Z_0$, non-inductive resistors 531, 532, 533, . . . of resistances $R_1$, $R_2$, $R_3$, . . . which bridge the control conductors of the coaxial cables 51 and 52 at points spaced by $\lambda/(4n)$, where $\lambda$ is the guided wave length of the center frequency of the high-frequency power sent from an input terminal 511 through the first coaxial cable 51 to an output terminal 512 and *n* is a positive integer, and conductors 541, 542, . . . , 546, . . . connecting the outer conductors of the coaxial cables 51 and 52.

Now it will be considered with respect to the center frequency of the frequency concernew that in what manner excellent directivity may be obtained with the directional coupler 50 of FIG. 4.

Referring to FIG. 5, a directional coupler 50' shown equivalently therein comprises a power source E and an impedance of cable characteristic impedance $Z_0$ interposed between the inner and the outer conductors of the first coaxial cable 51 at the input and the output terminals 511 and 512, respectively, and a short-circuiting wire shown by the dotted line and another impedance of cable characteristic impedance $Z_0$ interposed between the inner and the outer conductors of the second coaxial cable 52 at an input and an output terminal 521 and 522 thereof, respectively. Line G represents the common connection between the outer conductors 51 and 52 of FIGURE 4. It will now be assumed at the lengths between the input terminals 511 and 521 and the output terminals 512 and 522 are equal to each other and that each of the bridging resistors $R_1$, $R_2$, . . . , $R_k$, . . . , and $R_N$ bridges those points on the respective coaxial cables 51 and 52 which are at equal distances from the input terminals 511 and 521. For the time being, it may be assumed that the distances between the points at which the resistor $R_k$ is connected to the coaxial cables 51 and 52 and the corresponding points for the resistor $R_{k+1}$ may not be $\lambda/(4n)$. In order to attain the excellent directivity with the directional coupler 50' the only thing required is to nullify the potential difference between the inner and the outer conductors at the input terminal 521 of the second coaxial cable 52 or to nullify the electric current which would otherwise flow through the short-circuiting wire at the input terminal 521.

Now the distribution of the voltage and current of the circuit shown in FIG. 5 will be considered with reference to a circuit 50A of FIG. 5A wherein power sources of $+E/2$ are connected to the input terminals 511 and 521, respectively, and another circuit 50B of FIG. 5B wherein a power source of $+E/2$ is connected to the input terminal 511 of the first coaxial cable 51 while a power source of $-E/2$ is connected to the input terminal 521 of the second coaxial cable 52. Inasmuch as the coaxial cables 51 and 52 are similar to each other in the circuit 50A, the current $I_A$ flowing into each of the inner conductors at the input terminals 511 and 521 is given by $$I_A=E/(2Z_0)$$

because no current flows through any one of the bridging resistors $R_1$, $R_2$, . . . , and $R_N$. Incidentally, each of the currents flowing out from the inner conductors at the output terminals 512 and 522 will be denoted by $I_A'$. If the currents flowing into and out of the inner conductor of the first coaxial cable 51 of the circuit 50B at the input and the output terminals 511 and 512 are $I_B$ and $I_B'$, respectively, the currents flowing out of and into the inner conductor of the second coaxial cable 52 at the input and the output terminals 521 and 522 are $I_B$ and $I_B'$, respectively, because the signs are opposite to each other as regards the distortion of voltage and current in the coaxial cables 51 and 52. For excellent directivity of the directional coupler 50', the equation $$I_A=I_B$$

must hold in connection with the second coaxial cable 52. In order to make the current flowing into the power source $-E/2$ connected to the input terminal 521 of the second coaxial cable 52 of the circuit 50B equal to $E/(2Z_0)$, it is sufficient to select the positions for connection of the resistors $R_1$, $R_2$, . . . , and $R_N$ to the coaxial cables 51 and 52 and to select the resistance value for $R_1$, $R_2$, . . . , and $R_N$ so that the impedance of the directional coupler looking into the input terminals 511 and 521 may be equal to $2Z_0$. Under such circumstances, the directional coupler 50' becomes a pair of resistance-coupled coaxial cables such that the input and the output impedances may be favourable, and has the best directivity.

Also, the directivity of the directional coupler 50 of FIG. 4 for the supplied high-frequency power can be made substantially infinity, when the inner and the outer conductors of the coaxial cables 51 and 52 are interconnected at the output terminals 512 and 522 by terminating resistors 551 and 552 whose impedances are both $Z_0$, respectively, and also the resistances $R_1$, $R_2$, $R_3$, . . . of the resistors 531, 532, 533, . . . are so selected that the impedance of the directional coupler 50 between the input terminals 511 and 521 as seen from such terminals towards the terminating resistors 551 and 552 may be $2Z_0$ at the center frequency of the supplied high-frequency power.

Referring back to FIGS. 5, 5A, and 5B, the loss ratio L affecting the high-frequency power during its transmission from the input terminal 511 to the corresponding output terminal 512 is, if $I_A$ is equal to $I_B$, $$L=[(I_A+I_B)/(I_A'+I_B')]^2$$
$$=[2I_B/(I_B+I_B')]^2$$

while the coupling ratio C is $$1/C=[(I_A+I_B)/(I_A'-I_B')]^2$$
$$=[2I_B/(I_B-I_B')]^2$$

with the result that $$1/C=L/(\sqrt{L}-)^2$$

Examples of the above-described conditions for giving excellent directivities will now be given. For only two bridging resistors 531 and 532, $$R_2 \doteqdot R_1-2Z_0$$

if they are disposed at λ/4 interval. For three bridging resistors 531, 532, and 533, the resistances $R_1$, $R_2$, and $R_3$ are preferably so selected that $$R_3=R_1$$

and $$R_2 \doteqdot R_1[1-(2Z_0/R_1)^2]/2$$

may hold if they are disposed at λ/4 intervals. If the resistors 531, 532, and 533 satisfy the above condition, the directional coupler is advantageous because it is symmetrical. The coupling ratio is $$1/C=[1+R_1/(2Z_0]^2$$

in this case. If coaxial cables called 3C2W whose nominal characteristic impedance is 75 ohms are used with three bridging resistors 531, 532, and 533 disposed at λ/4 intervals, preferably, resistances $R_1$, $R_2$, and $R_3$ are 330 ohms, 150 ohms, and 330 ohms, respectively. With five bridging resistors, examples of the resistances are 1 kilohm, 440 ohms, 400 ohms, 440 ohms, and 1 kilohm, respectively.

As regards a directional coupler 50 wherein four bridging resistors are disposed at λ/8 intervals, to obtain the best directivity at the center frequency is to nullify the vector sum of voltages $e_{531}$, $e_{532}$, $e_{533}$, and $e_{534}$ reaching the input terminal 521 of the second coaxial cable 52 through the bridging resistors 531, 532, 533, and 534, respectively. The voltages reaching the input terminal 521 through neighbouring bridging resistors, respectively, are in phase quadrature as shown in FIG. 6 because the length of each portion of the coaxial cables 51 and 52 interposed between such bridging resistors is λ/8 and consequenlty the sum of such lengths are λ/4. It follows therefore if the coupling ratio is small, that the best directivity is obtained when $$R_{531}=R_{533} \text{ and } R_{532}=R_{534}$$

where $R_{531}$, $R_{532}$, $R_{533}$, and $R_{534}$ are resistances of the bridging resistors 531, 532, 533, and 534, respectively.

Now the frequency characteristics of directivity of the directional coupler 50 shown in FIG. 4 will be considered. Better directivity is obtained over a wider frequency band with an increasing number of bridging resistors 531, 532, 533. . . . .

If the bridging resistors 531, 532, 533, . . . are disposed along the coaxial cables 51 and 52 at λ/4 intervals, and if the resistances of the resistors are high as compared with the cable impedance $Z_0$ of the coaxial cables 51 and 52, then the high-frequency power of the center frequency of the frequency band concerned supplied from the input terminal 511 of the first coaxial cable 51 appears, passing through the bridging resistors 531, 532, 533, . . . , at the input terminal 521 of the second cable 52 as voltages $e_{531}$, $e_{532}$, $e_{533}$, . . . , respectively, every other one of which have opposite senses because such high-frequency voltages have a difference of twice λ/4 in the lengths of their paths or of 180 degrees in their paths. If a polygon formed by vectors representing the voltages $e_{531}$, $e_{532}$, $e_{533}$, . . . closes, the resultant voltage at the input terminal 521 of the second coaxial cable 52 becomes zero and consequently the directivity becomes infinitely large. If three bridging resistors satisfy the above-mentioned preferable condition, $$-e_{532} \doteqdot 2e_{531}=2e_{533}$$

results, and a vector polygon for the high-frequency power of the center frequency closes as shown in FIG. 7A. If voltages produced by those portions of the high-frequency power which deviate in frequencies from the center frequency are designated by $e_{531}'$, $e_{532}'$, and $e_{533}'$, phase difference between the vectors $e_{532}'$ and $e_{533}'$ is equal to the phase difference D between the vectors $e_{531}'$ and $e_{532}'$, with the result that the vector polygon will be as shown in FIG. 7B for the high-frequency power of the deviated frequency. If a triangle formed by the vectors $e_{531}$, $e_{532}$, and $e_{533}$ will substantially close, another triangle formed by the vectors $e_{531}'$, $e_{532}'$, and $e_{533}'$ will also substantially close because phase difference $180°-D$ is not so large. Thus, the directional coupler 50 has a large directivity which is substantially constant over a wide frequency band.

As for two examples for which the resistances of the bridging resistors have been given in ohms, the directivities are about 20 db and 30 db, respectively, in a range ±10 mc. on both sides of a center frequency of 70 mc., while the deviation of the coupling coefficient is about 0.1 db within the range.

The coaxial cables 51 and 52 may have different cable impedances of $Z_0$ and $mZ_0$, respectively, where $m$ is a real number. The directivity for the center frequency of the band being handled will become substantially infinitely large when the inner and the outer conductors of the coaxial cables 51 and 52 are terminated at the output terminals 512 and 522 by impedances 551 and 552 whose impedances are $Z_0$ and $mZ_0$, respectively, and when the points of connection of the bridging resistors 531, 532, 533, . . . and their resistances are so selected that the impedance looking in to the input terminals 511 and 521 of the coaxial cables 51 and 52 along the inner conductors thereof towards the terminating impedances 551 and 552 may be $(m+1)$ $Z_0$. The coaxial cables 51 and 52 may be substituted by a pair of balanced or unbalanced Lecher wires. Furthermore, such coaxial cables 51 and 52 or Lecher wires need not be straight but may be looped.

As has been described, the directional coupler 50 shown in FIG. 4 has large coupling coefficient and directivity, has flat coupling coefficient and directivity frequency characteristics over a wideband, and is easy to produce.

Referring next to FIG. 8, there is shown therein a compensating arrangement of the invention which is preferred for compensating, over a wide frequency band of several scores of megacycles, the frequency characteristics of amplitude and phase of an electric signal in the VHF band and particularly in the intermediate-frequency band of a microwave wideband relay system. A point $C_0$ is selected along delay line 15 having an input terminal 11 and a non-reflective termination 12. The delay line consists of a coaxial cable of cable impedance $Z_0$. A series of tap points $C_0$, $C_1$, $C_2$, $C_3$, . . . , and $C_{-1}$, $C_{-2}$, $C_{-3}$, . . . are formed along the delay line 15 consisting of the selected point $C_0$ and the points spaced from the selected point $C_0$ by every one -$4n^{th}$ ($\frac{1}{4}n$) of the wavelength of the high-frequency power guided through the delay line 15 (where $n$ is a positive integer) towards the input terminal 11 and the non-reflective termination 12, for connection of the bridging resistors 531, 532, 533, . . . of the directional coupler 50 explained with reference to FIG. 4 to the inner conductor of the delay line 15. A plurality of directional couplers as described in connection with FIGURE 4 are attached to each set of tap points through resistors 531, 532, 533, . . . wherein delay line 15 serves as one of the coaxial cables of the directional couplers. In the compensating arrangement shown in FIG. 8, attached to a set of tap points $C_2$, $C_1$, $C_0$, $C_{-1}$, and $C_{-2}$ is a reference directional coupler 500 for tapping off the main signal $e_0$ which is a portion of the reference signal $E_0$; to another set of tap points $C_{18}$, $C_{17}$, $C_{16}$, $C_{15}$, and $C_{14}$ and to still another set of tap points $C_{-14}$, $C_{-15}$, $C_{-16}$, $C_{-17}$, and $C_{-18}$ are connected a first leading and a first lagging-signal directional coupler 501 and 502 for tapping off a first leading and a first lagging signal $e_1$ and $e_{-1}$ which are portions of first signals $E_1$ and $E_{-1}$ leading and lagging the reference signal $E_0$, respectively; and to a further set of tap points $C_{30}$, $C_{29}$, $C_{28}$, $C_{27}$, and $C_{26}$ and to a still further set of tap points $C_{-26}$, $C_{-27}$, $C_{-28}$, $C_{-29}$, and $C_{-30}$ are connected a second leading and a second lagging-signal direction coupler 503 and 504 for tapping off a second leading and a second lagging signal $e_2$ and $e_{-2}$ which are portions of signals $E_2$ and $E_{-2}$, respectively. Although only two pairs of directional couplers 501–502 and 503–504 are shown in FIG. 8 besides the reference directional coupler 500, the number of directional couplers to be attached to the delay line 15 is not restricted to five but may be more. Also, it is to be noted that a pair of leading and lagging-signal directional couplers, such as the directional couplers 501 and 502, need not be disposed at equal distance from the selected point $C_0$ towards the input terminal 11 and the non-reflective termination 12, respectively, as illustrated in conjunction with the compensating arrangement of FIG. 8, but may preferably be disposed assymetrically in some cases. The input terminals of the second coaxial cables of the directional couplers 500, 501, 502, 503, and 504 are terminated with non-reflective terminations 60′, 61′, 62′, 63′, and 64′, respectively, for absorbing very small portions of the high-frequency power which appear at such input terminals due to the fact that the directivities of the directional couplers are in practise not infinitely large. On the other hand, the output terminals of the second coaxial cables are connected to branch coaxial cables 60, 61, 62, 63, and 64 having the same cable characteristic impedance $Z_0$ for leading out the tapped-off main, leading, and lagging signals $e_0$, $e_1$, $e_{-1}$, $e_2$, and $e_{-2}$, respectively. The coaxial cables 60, 61, 62, 63, and 64 have a common length between the respective directional couplers 500, 501, 502, 503, and 504 on one side and a common summing circuit 45 on the other side. Intermediate the paired directional couplers 501, 502, 503, and 504 and the common summing circuit 45 are disposed variable attenuators 71, 72, 73, and 74 and preferably line stretchers of $1/(4n)$-wavelength 701, 702, 703, and 704, respectively. Adjusted leading and lagging signals $e_1'$, $e_{-1}'$, $e_2'$, and $e_{-2}'$, whose amplitudes are adjusted by the respective variable attenuators 71, 72, 73, and 74 and whose phases are adjusted, if required, by the respective $1/(4n)$-wavelength adjustable delay lines 701, 702, 703, and 704, are added at the summing circuit 45 to the main signal $e_0$ to produce a resultant signal $e_r$, which is then amplified by an auxiliary amplifier 47 and appears at output terminal 49.

In the compensating arrangement of the invention, any one of the paired directional couplers 501, 502, 503, and 504 may freely be displaced by $\lambda/(4n)$ steps along the delay line 15. In contrast to the conventional arrangement 10 wherein the length of the delay line 15 must be changed if it is required to adjust the delay time $t_1$, compensation can be simply adjusted by the compensating arrangement of the invention merely by displacing the points of connection of the bridging resistors to other tap points. By providing interlocking or ganged devices shown by dotted lines 790 and 791 between the $1/(4n)$-wavelength line stretchers 701, 702, 703 (and 704 adjustments may be made so that when the length of a pair of the branch coaxial cables is lengthened by a certain amount within $\pm 1/(8n)$-wavelength range by the $1/(4n)$-wavelength line stretcher through which the branch coaxial cable passes, the length of the other of the pair may be shortened by the same amount by the $1/(4n)$-wavelength line stretcher which the other branch coaxial cable passes through, making it possible to continuously vary the phases of the leading and the lagging signals $e_1$ and $e_{-1}$ whose phases would otherwise vary only discontinuously by skip displacement of the directional couplers by every $\lambda/(4n)$ length along the delay line 15. Also, the provision of interlocking or ganged devices 505 and 506 shown by other dotted lines between the paired directional couplers 501 and 502 and the like, facilitates adjustment of the positions of such directional couplers. With the compensating arrangement of the invention it is thus possible to obtain optimal amplitude or phase compensation characteristics by addition of echoes. It will now be understood that in contrast to the conventional compensating arrangement 10 wherein when the distance $l(1, 0)$ between the reference directional coupler 20 and the adjacent first directional coupler 21 is lengthened with a view to adjusting the delay time $t_1$, the distance $l(2, 0)$ between the reference directional coupler 20 and the second directional coupler 23 can be kept unchanged, only by shortening the distance between the first and the second directional couplers 21 and 22. It is possible with the compensating arrangement of the invention to alter the distance between the reference directional coupler 500 and the first directional coupler 501 without affecting at all the distance between the reference directional coupler 500 and the second directional coupler 503 by virtue of the fact that the first directional coupler 501 is freely displaceable by $\lambda/(4n)$ steps along the delay line 15.

In a compensating arrangement of the invention it will now be noted, by designating with $P_0$ the central angular frequency in radians per second of the high-frequency power being handled and consequently by representing with $\pi/(2p_0n)$ the time required for the high-frequency power to travel the distance $\lambda/(4n)$ between the neighbouring tap points $C_i$ and $C_i+1$, that if $C_m$ is such a tap point among the tap points contained in the directional coupler 50*i* for the *i*th leading signal as may correspond to the selected point $C_0$ in the reference directional coupler 500, the leading signal $e_i$ tapped off at the directional coupler 50*i* leads in phase the main signal $e_0$ by $\pi m/(2p_0n)$ and similarly that if such a tap point among the tap points contained in the directional coupler 50*j* for the *j*th lagging signal $e_{-j}$ is $C_s$ as may correspond to the selected point $C_0$ in the reference directional coupler 500, the lagging signal $e_{-j}$ tapped off by the directional coupler $50_j$ lags the main signal $e_0$ by $\pi s/(2p_0n)$ in phase. The compensating arrangement of the invention therefore serves as an amplitude compensating arrangement when $m$ is equal to $s$ and as a phase compensating arrangement when $m$ is equal to $s+2n$. With the compensating arrangement of the invention, it will now also be understood that the variable terminal resistors 31′–34′ which are needed in conventional compensating arrangement 10 are no longer necessary, and also mere adjustment of the positions of the directional couplers 500–504 can bring forth amplitude and/or phase compensation, where selection of impedances of variable terminal resistors 31′–34′ brings forth with the conventional compensating arrangement 10 either amplitude or phase compensation but not both.

The phase-compensated resultant signal $e_r$ obtained with the compensating arrangement of the invention by adding to the main signal $e_0$ a lagging signal $e_{-1}$ which lags the main signal $e_0$ by time $t_1$ and a leading signal $e_1$ which leads the main signal by time $t_1+\pi/p_0$ (i.e., employing only three direction couplers 500, 501 and 502) is given by $$e_r=\exp(j_pt).[1+j.K_1.\exp(-j\pi[p_0-p])/[2p_0])\times\sin(pt_1+\pi[p_0-p]/[2p_0])]$$

and under the condition of $$p=p_0,\ \ldots$$

$$e_r=\exp(jpt).(1+j.K_1.\sin pt_1)$$

as is the case in Equation 4. The magnitude of the resultant signal $e_r$ is $$|e_r|=\sqrt{1+(K_1+\sin pt_1)^2}$$

where $K_1$ is very small as compared with unity in many cases, with the result that $$|e_r|=1+K_1^2.(1-\cos 2pt_1)/4$$

which shows that the magnitude contains a new amplitude distortion having twice the pitch of the phase distortion to be compensated. The new distortion, however, can be compensated by further adding to the main signal $e_0$, in addition to the above-mentioned leading and the lagging signals $e_1$ and $e_{-1}$, another pair of leading and lagging signals (i.e., through direction couplers 503 and 504) which leads and lags the main signal by about $2t_1$. In other words, such an amplitude distortion can easily be compensated with the compensating arrangement of the invention by merely adding another pair of directional couplers and the necessary associated circuits. According to the invention, it is thus possible to provide a phase compensating arrangement which is easily adjustable and which has little amplitude distortion by virtue of simpleness of transfer and addition of the directional couplers.

Good frequency characteristics of coupling degree of the directional coupler used in a compensating arrangement of the invention makes it possible to dispense with the amplitude equalizer 46 of linear or other slope which has been indispensable in a conventional compensating arrangement 10 due to difficulties in improving the frequency characteristics of the coupling degree of the directional couplers 20–24. With the compensating arrangement of the invention it is also possible to solve the problems of thermal noise because it is easy to augment the coupling degree with the directional coupler 50 shown in FIG. 4 and used in the compensating arrangement of the invention.

Now an example will be given of improving with a compensating arrangement of the invention the amplitude-frequency characteristics of a transmission line for the VHF or UHF band without affecting the delay-time characteristics of such a transmission line. It will be assumed that the requirement is to substantially flatten the amplitude-frequency characteristics of a transmission line shown by solid-line curve 81 in FIG. 9 wherein the abscissa shows the frequency $f$ of the high-frequency voltage while the ordinate shows the gain for the high-frequency voltage over a band B ranging from an upper-limit frequency $f_u$ down to a lower-limit frequency $f_l$ displaced from the center frequency $f_c$ of the band on the both sides thereof by B/2 and —B/2, respectively. The amplitude characteristic curve of the transmission line has a dale at a frequency $f_0$ neighbouring the center frequency $f_c$, and hills at frequencies given by $$f_1-f_0=f_0-f_{-1}=F$$

For the purpose of flattening, it is sufficient to interpose in the transmission line an equalizer having amplitude-frequency characteristics which are shown by a dotted-line curve 82 and are substantially complementary to the amplitude characteristic curve 81 throughout the band B. The amplitude characteristic curve 82 of the equalizer has a hill and dales at the frequencies $f_0$ and $f_1$ and $f_{-1}$, respectively. It is not preferable to enlarge the gain of the equalizer at frequencies $f_2$ and $f_{-2}$ of further hills and outside of such frequencies $f_2$ and $f_{-2}$ because such enlargement will deteriorate the overall selectivity of the transmission line and the equalizer. It is in the meantime possible to given attenuation at such outer frequencies by the amplifier 47. The amplitude characteristic curve 82 may be obtained with a compensating arrangement shown in FIG. 8, by adjusting the first leading and lagging-signal directional couplers 501 and 502 so as to result in an amplitude characteristic curve 85*a*, such as shown in FIG. 10*a*, having a dale and hills at the frequency $f_0$ of the central hill of the curve 82 and at frequencies $f_2'$ and $f_{-2}'$ adjacent the outer-hill frequencies $f_2$ and $f_{-2}$, respectively. Because of the nature of the compensating arrangement of the invention, the delay time T for either of the leading or the lagging signal must satisfy, in order to provide a dale at the frequency $f_0$, $$2\pi f_0 T=(2N+1)\pi$$

where N is an integer. Also, the frequency $f_2'$ of one of the outer hills must satisfy $$(2N+1)(f_2'-f_0)/f_0=1$$

with the result that the delay time T must satisfy $$f_2'-f_0 \doteqdot f_2-f_0$$

and furthermore form a dale at the frequency $f_0$. In the next place, the second leading and lagging-signal directional couplers 503 and 504 are adjusted so as to bring forth an amplitude characteristic curve 85*b*, such as shown in FIG. 10*b*, having hills at the frequencies $f_0$, $f_2'$ and $f_{-2}'$ of the dale and hills in the amplitude characteristic curve 85*a*, and also having dales at frequencies $f_1'$ and $f_{-1}'$ adjacent the frequencies $f_1$ and $f_{-1}$ of the dales of the amplitude characteristic curve 82 of the equalizer, respectively. This can be done by settling at 2T the delay time between the reference direction coupler 500 and the second directional leading-signal directional coupler 503. By so selecting, $$2\pi f_0\times 2T=2(2N+1)\pi$$

results at the frequency $f_0$ of the central hill, wherein the righthand side is an even multiple of $\pi$. Furthermore, the pitch between the hills and dales bacomes a half of that in the amplitude characteristic curve 85*a*, and $$f_2'-f_1'=f_{-1}'-f_2'=f_1'-f_0=f_0-f_{-1}'$$

follows. In both cases, the reference directional coupler 500 determines the mean output voltage $V_0$ for either of the amplitude characteristic curves 85*a* and 85*b*. Addition of the main signal $e_0$ and the amplitude adjusted leading and lagging signals $e_1'$ and $e_{-1}'$ for giving the amplitude characteristic curves 85*a* and 85*b* at the summing circuit 45 results a resultant signal $e_r$ which has an amplitude characteristic curve 85*c* shown in FIG. 10*c*. Although frequencies $f_1''$ and $f_{-1}''$ at which the amplitude characteristic curve 85*c* of the resultant signal $e_r$ has dales of amplitude can not completely agree with the frequencies $f_1$ and $f_{-1}$ at which the amplitude characteristic curve 81 of the transmsision line has hills of amplitude, the former may approach the latter sufficiently for the practical purposes. Furthermore, it is possible to reduce as shown by a curve 85*e* in FIG. 10*e* the secondary component of the overall compensation characteristics of the compensating arrangement of the invention by interposing an amplitude compensator 46 shown in FIG. 1 between the summing circuit 45 and the auxiliary amplifier 47 and by providing the amplitude compensator 46 with a parabolic type amplitude-compensation characteristic curve 85*d* shown in FIG. 10*d*. Alternatively, it is also possible to reduce the secondary complement of the overall compensation characteristics of the compensating arrangement by disposing between the reference directional coupler 500 and the first leading and lagging-signal directional couplers 501 and 502 a further pair of directional couplers (not shown) for tapping off a pair of leading and lagging signals, respectively. Thus, it is possible to widen the amplitude-frequency characteristics of a transmission line without deteriorating the phase and the required selectivity characteristics of the transmission line. Preferably, the parabolic type amplitude equalizer 46 is such that one has small phase distortion and in that the frequency of the central dale is adjustable to some extent. Such a compensator can be realized relatively easily with a known circuit of L, C and R elements.

In any event, not only is it easy with a compensating arrangement of the invention to compensate ripple-like distortions of the amplitude characteristics of a transmission line of the VHF to UHF band, but also to widen the amplitude characteristics without substantially affecting the delay characteristics by adding a parabolic amplitude compensator, if required.

It will be easily understood that it is possible to modify the compensating arrangement of FIG. 8, for example by substituting for the coaxial cables of the delay line 15 and the branch coaxial cables 60–64 balanced or unbalanced Lecher lines. Furthermore, that end of the delay line 15 which is opposite to the input terminal 11 need not be terminated by a non-reflective termination 12 but may instead be connected to other devices for utilizing the high-frequency power applied to the delay line. Also, it will be understood that the cable impedances of the branch coaxial cables 60–64 may not be equal to that of the delay line and to each other, in view of the fact described in conjunction with the directional coupler 50 that the two coaxial cables 51 and 52 need not have equal cable impedances. Also, the lengths of the branch coaxial cables 60–64 need not be equal to each other but may instead be such that the reference signal $e_0$ and the leading and lagging signals $e_1$ and $e_{-1}$ may be summed up at some device such as the summing circuit 45. The variable attenuators 71 and 72 and the like interposed between the paired directional couplers 501 and 502 and the like and the summing circuit 45 may be fixed attenuators depending on the purposes which they are called upon to serve. In this connection, it will be noted that attenuators employed in the transversal equalizer may be either of variable and fixed attenuators and may be even such ones whose attenuation ratios are less than unity.

It can therefore be seen from the foregoing description that the instant invention provides a novel transversal equalizer for use in radio or television relay systems and the like in which a unique type of directional coupler is employed within the transversal equalizer having excellent coupling and directional characteristics far superior to those found in conventional devices enabling a transversal equalizer to be constructed through much simpler manufacturing techniques and which greatly simplifies the adjustment of the transversal equalizer preparatory to its use. Basically, the transversal equalizer is comprised of a first delay line having a plurality of tap off points arranged at spaced intervals along the line. A first direction coupler is coupled to the first delay line at a point intermediate its ends and is comprised of a second delay line section coupled to the tap off points of the first delay line by means of a plurality of resistors. A first end of the first delay line receives the signal which is to be phase and amplitude compensated. The opposite end of the first delay line has coupled thereto a terminating resistor. A first end of the directional coupler delay line section is coupled to a terminating resistor while the second end supplies that portion of the signal under transmission to a summing circuit. Similar direction couplers substantially identical in design to the first direction coupler mentioned above are coupled in paired fashion with each direction coupler of the pair being arranged on opposite sides of the first direction coupler. The output signals from these pairs of direction couplers will respectively lead and lag the signal emitted from the first direction coupler and these signals are summed in a summing circuit to obtain a compensating curve 85*c*, shown in FIGURE 10*c* of the drawings to exactly compensate for the phase and amplitude distortion which the incoming signal under transmission undergoes. Another novel aspect of the instant invention is that the pairs of direction couplers arranged on opposite sides of the first mentioned direction coupler may be ganged together so as to simultaneously adjust the distances of the direction coupler pairs in order to adjust the leading and lagging phases of their output signals. This arrangement completely eliminates the need for an amplitude equalizer circuit such as that circuit 46, shown in FIGURE 1, which is required in the prior art devices, in order to obtain a distortion free output signal at the output terminal 49, shown in FIGURE 1.

Since the phase adjustments controlled by the ganged mechanism denoted by the numerals 505 and 506, shown in FIGURE 8, permit only discrete phase angle changes, further phase adjustment means are provided between the outputs of each of the direction coupler pairs and the summing means to enable a final phase adjustment to be made. The line stretchers 701–704, shown in FIGURE 8, for each pair of directional couplers, may likewise be ganged together to still further simplify the final phase adjustments which may be required. Normally, the effectiveness of the directional couplers set forth herein obviate the need for the line stretchers 701–704. Amplitude adjustments of the signals emitted from the pairs of directional couplers may likewise be provided between the line stretchers 701 and 704 and the summing means 45. In most cases the amplitude attenuators 71–74 may likewise be omitted due to the superior characteristics of the directional couplers and as a direct result of the high coupling coefficient obtained through the use of the directional couplers of the instant invention.

It is to be understood that the foregoing description of specific examples of this invention is not to be considered as a limitation on its scope.

What is claimed is:

1. A directional coupler employed in systems which compensate for distortion of an electrical signal wave comprising:

first and second transmission lines having characteristic impedances $Z_0$ and $mZ_0$;

said second transmission line being of a predetermined length;

said first transmission line being at least as long as said second transmission line;

first and second terminating impedances $Z_0$ and $mZ_0$ each being respectively connected to one end terminal of said first and second transmission lines;

the remaining end terminal of said first transmission line receiving said electrical signal wave;

the remaining end terminal of said second transmission line providing the desired output signal;

a plurality of non-inductive resistors coupling said first and second transmission lines;

each of said resistors having their end terminals connected to said first and second transmission lines;

the points of connection along said first and second transmission lines being arranged at equally spaced intervals so as to space said resistors apart by a distance ¼*n* wavelength of the substantial center frequency of said electrical signal wave interconnecting said first and second transmission lines.

2. A directional coupler according to claim 1, wherein said plurality of resistors is an odd number, the resistance of said resistors being of increasing value from the center resistor outwardly.

3. A directional coupler according to claim 2, wherein each of said resistors has a value substantially higher than the value of the characteristic impedance of said transmission line.

4. A system according to claim 1, wherein said directional coupler means comprises a plurality of directional couplers each constructed as defined in claim 1, spaced apart along said first transmission line an integral number of ¼*n* wavelength of said center frequency, said first transmission line being common to all of said directional couplers; and further comprising a summation circuit, and means for coupling each of the output terminals of said directional couplers to said summation circuit.

5. A system according to claim 4, wherein said means for coupling each of said outputs to said summation circuit comprises attenuating means.

6. A system according to claim 5, wherein said means for coupling selected ones of said outputs and further comprises line stretchers intermediate said terminals and said summation circuit to provide an additional phase adjustment for selected ones of the signals applied to the summation circuit.

7. A system according to claim 6, further comprising common control means for adjusting the value of line stretchers on opposite sides of the central one of said coupling means to provide simultaneous phase adjustment of the signals emitted from line stretchers coupled to said common control means.

8. A system according to claim 4 wherein said first transmission line is provided with tap-off points spaced apart ¼n of said electrical signal wavelength along its length;

means for adjustably coupling the second transmission lines of each of said directional couplers to said tap-off points in steps of ¼n of said wavelength.

9. A system according to claim 8 further comprising means for simultaneously adjusting the position of pairs of said couplers on opposite sides of a central one of said couplers.

10. Means for improving the amplitude and delay characteristics of a signal under transmssion comprising:

a first two-conductor delay line having an input and an output end and having a characteristic impedance $Z_0$;

a first terminating resistor coupled at said output end;

said signal being applied to said input end;

a plurality of additional two-conductor delay lines each having a characteristic impedance $mZ_0$ where $m$ is a real number;

said first delay line having a plurality of tap-off points arranged at spaced intervals along said first delay line, each interval being of a length $\lambda/4n$ where $\lambda$ is the electrical wavelength of the signal being transmitted and $n$ is any real integer;

first means coupling one conductor of one of said additional delay lines to one conductor of said first delay line, said first means comprising a plurality of resistors coupled to selected ones of said tap-off points intermediate the ends of said first delay line;

said resistors being coupled at spaced intervals along said one delay line equal to the spacing of said tap-off points;

a second terminating resistor coupled to one end of said one additional delay line;

an output signal appearing at the other end of said second delay line.

11. The device of claim 10 wherein at least one pair of said additional delay lines are coupled to said first delay line each being on opposite sides of said one additional delay line to develop output signals which respectively lead and lag the output signal obtained from said one additional delay line;

summing means;

second means coupling said three output signals to said summing means to generate a resultant output signal which is a phase and amplitude corrected form of said signal under transmission.

12. The device of claim 11 wherein the second conductors of said first delay line and said additional delay lines are short circuited to one another at a plurality of spaced intervals along said first and said additional delay lines.

13. The device of claim 12 wherein said first means comprises a plurality of adjustable attenuation means coupled between each one of said pair of additional delay lines and said summing means for making final amplitude adjustments of the signals fed to said summing means.

14. The device of claim 13 wherein said first means is further comprised of a plurality of adjustable line stretchers each being coupled between each one of said pair of additional delay lines and an associated one of said attenuation means for making final phase adjustments to the signals being fed to said summing means.

15. The device of claim 14 further comprising amplifier means coupled to the output of said summing means for amplifying the phase and amplitude corrected signal.

16. The device of claim 14 further comprising common adjustment control means coupled to said line stretchers for simultaneously adjusting the phases of the leading and lagging signals.

17. The device of claim 11 further comprising common adjustment control means coupled to said pair of additional delay lines for simultaneously adjusting their spacing from said one additional delay line in incremental steps in accordance with the spacing of said tap-off points for adjusting the phases of the signals developed by said pair of additional delay lines.

18. The device of claim 11 further comprising at least one more pair of said additional delay lines being coupled to said first delay line tap-off points and being arranged on opposite sides of said first pair of additional delay lines;

said first means coupling further including additional means for coupling said second pair of said additional delay lines to said first delay line in the same manner in which the first pair of delay lines is coupled to said first delay line.

19. The device of claim 18 wherein said second means is further comprised of means for coupling the output signals of said second pair of delay lines of said summing means.

References Cited

UNITED STATES PATENTS

| | | | |
|---|---|---|---|
| 2,679,632 | 5/1954 | Bellows | 333—10 |
| 2,759,044 | 8/1956 | Oliver | 178—7.5 |
| 2,760,164 | 8/1956 | Graham | 333—28 |
| 2,896,176 | 7/1959 | Bellows | 333—28 |
| 3,050,700 | 8/1962 | Powers | 333—29 |
| 3,181,089 | 4/1965 | Fujimoto | 333—28 |
| 3,211,899 | 12/1965 | Shreve | 325—181 |

OTHER REFERENCES

Bell System Technical Journal "Transversal Equalizers," by Graham et al.; vol. 36, 1957, pp. 1429–50.

HERMAN KARL SAALBACH, *Primary Examiner*.

C. BARAFF, *Assistant Examiner*.